US008671224B2

(12) United States Patent
Bell et al.

(10) Patent No.: US 8,671,224 B2
(45) Date of Patent: Mar. 11, 2014

(54) COMPUTER NETWORK DEFENSE

(75) Inventors: Mark Brian Bell, San Antonio, TX (US); Scott Cruickshanks Kennedy, San Diego, CA (US); Carleton Royse Ayers, II, San Diego, CA (US); Brian Whyte, San Diego, CA (US); Kay Myers, El Cajon, CA (US)

(73) Assignee: Leidos, Inc., Reston, VA (US)

( * ) Notice: Subject to any disclaimer, the term of this patent is extended or adjusted under 35 U.S.C. 154(b) by 0 days.

(21) Appl. No.: 13/554,433

(22) Filed: Jul. 20, 2012

(65) Prior Publication Data
US 2013/0019312 A1    Jan. 17, 2013

Related U.S. Application Data

(63) Continuation of application No. 11/340,726, filed on Jan. 27, 2006, now Pat. No. 8,266,320.

(60) Provisional application No. 60/647,009, filed on Jan. 27, 2005.

(51) Int. Cl.
*G06F 15/16* (2006.01)
*G06F 15/173* (2006.01)

(52) U.S. Cl.
USPC .......................................... 709/249; 709/238

(58) Field of Classification Search
USPC .............................................. 726/23; 709/249
See application file for complete search history.

(56) References Cited

U.S. PATENT DOCUMENTS

| 5,884,025 | A | * | 3/1999 | Baehr et al. | 726/13 |
|---|---|---|---|---|---|
| 7,023,979 | B1 | | 4/2006 | Wu et al. | 379/265.11 |
| 7,133,896 | B2 | | 11/2006 | Ogdon et al. | 709/205 |
| 7,213,260 | B2 | | 5/2007 | Judge | 726/3 |
| 7,249,378 | B2 | * | 7/2007 | Wesigner et al. | 726/15 |
| 7,467,202 | B2 | * | 12/2008 | Savchuk | 709/224 |
| 7,913,303 | B1 | * | 3/2011 | Rouland et al. | 726/23 |
| 2001/0034847 | A1 | * | 10/2001 | Gaul, Jr. | 713/201 |
| 2002/0010800 | A1 | * | 1/2002 | Riley et al. | 709/249 |
| 2002/0178383 | A1 | | 11/2002 | Hrabik et al. | 726/4 |
| 2002/0188887 | A1 | | 12/2002 | Largman et al. | 714/13 |
| 2003/0014669 | A1 | * | 1/2003 | Caceres et al. | 713/201 |
| 2003/0046577 | A1 | * | 3/2003 | Silverman | 713/200 |
| 2003/0056116 | A1 | | 3/2003 | Bunker et al. | 726/25 |
| 2003/0167410 | A1 | | 9/2003 | Rigstad et al. | 726/1 |
| 2003/0172145 | A1 | | 9/2003 | Nguyen | 709/223 |
| 2004/0030931 | A1 | | 2/2004 | Chamandy et al. | 726/11 |
| 2004/0229199 | A1 | | 11/2004 | Ashley et al. | 434/323 |
| 2004/0250107 | A1 | * | 12/2004 | Guo | 713/200 |
| 2005/0015624 | A1 | * | 1/2005 | Ginter et al. | 713/201 |

OTHER PUBLICATIONS

Kennedy, Scott C., et al., "Computer Network Defense Exercise (CNDX), 'Train As You Fight,'" Nov. 2, 2004, 25 pp.

(Continued)

*Primary Examiner* — Gerald Smarth

(74) *Attorney, Agent, or Firm* — Bey & Cotropia PLLC

(57) ABSTRACT

Training defense of a computer network. The system includes an enterprise asset subsystem to be defended. The enterprise asset subsystem runs operating system, support services, and application programs. The system also includes a neutral subsystem that is in communication with the enterprise asset subsystem and is used to set up and run at least one exercise scenario, and score performance of enterprise asset defenders in defending the system against exploits. Exploits are launched by an exploitation subsystem communication with the enterprise asset subsystem.

8 Claims, 16 Drawing Sheets

(56) References Cited

OTHER PUBLICATIONS

Ayers, Duke, "TeamDefend, a CyberPatriot Initiative, FAA Distinguished Lecturer Series, 'Fight As You Train,'" Mar. 17, 2004, 35 pp.
Ayers II, Carleton R., "TeamDefend, A White Paper on Strengthening the Weakest Link: Organizational Cyber Defense Training, A CyberPatriot Initiative," 5 pp.
Ayers, Duke, "TeamSentry, A New Training Model for Defending the Critical Infrastructure," 13 pp.
Myers, Kay, and Ayers, Duke, "Computer Network Defense Exercise (CNDX), A Tool for Unit Level Cyber Defense Training," 2 pp.

* cited by examiner

CNDX Trouble Ticket

400

Trouble Ticket Type: Compromised Host ← 401

Username: bellm

IP Address of Problem Host: 172.16.3.31 ← 402

Details: The analyst has noticed malicious activity on this system. The activity includes broadcast (or wall) messages to logged in users and recurring reboots of the system. The analyst is investigating the matter and will proceed with patching and reconfiguration of services, where necessary.

Add Ticket

COMPUTER NETWORK DEFENSE

CROSS-REFERENCE TO RELATED APPLICATIONS

This application is a continuation of U.S. application Ser. No. 11/340,726, filed Jan. 27, 2006, which claims benefit of U.S. Provisional Patent Application No. 60/647,009, filed Jan. 27, 2005, both of which are incorporated herein by reference in their entirety.

STATEMENT REGARDING FEDERALLY SPONSORED RESEARCH OR DEVELOPMENT

Embodiments of the invention disclosed herein may have been conceived or first actually reduced to practice in the performance of work under one or more of the following Government contracts: Contract No. GS-00T-99AL-D0210 with the General Services Administration; Contract No. N66001-04-D-0001 with the U.S. Navy SPAWAR Systems Center; and, Contract No. N66001-04-D-0022 with the U.S. Navy SPAWAR Systems Center. As a result, the Government may have certain rights in the invention.

BACKGROUND

Embodiments of the invention relate to computer security. Specific embodiments relate to training information technology (IT) staff in the defense of computer networks.

Maintaining computer network security is become an increasingly difficult task. The internal (insider) threat has historically accounted for the greatest amount of misuse activity; and its consequence affects even the most trusted networks. Whether intentional or through improper procedure, the insider threat has resulted in lost productivity, espionage and fraud. The Internet plays an ever-increasing role in our national IT infrastructure as its ubiquitous nature provides a very cost-effective and high availability communication network. This world-wide infrastructure complements the trusted networks providing long-haul communications as well as remote management connectivity to Supervisory Control and Data Acquisition (SCADA) units connected to critical enterprise operations. The widening use of the Internet introduces increased exposure to the external threat such as corporate spies, cyber terrorists, and a growing number of "wannabe" hackers.

While higher-profile exploits (primarily external threats) such as "Code Red," "Nimda," "Blaster," and "Sasser" are covered by the media, many more cyber incidents go unpublicized; at times because system administrators and security personnel are often ill-prepared to recognize, mitigate, and document cyber incidents. Compounding the situation is that knowledgeable hackers can use the aggregated power of low-value compromised systems to execute a coordinated attack against more a more critical, better defended system. As such, most any IT resource connected to the Internet, regardless of its importance, becomes a weak link in the IT infrastructure if left unprotected. To protect these networks and resources, strong information assurance measures must be put in place to ensure the uninterrupted, reliable operation of these critical enterprise systems in the face of both internal and external threats.

SUMMARY OF THE INVENTION

Embodiments of the invention include a system for training defense of a computer network. The system includes an enterprise asset subsystem to be defended. The enterprise asset subsystem runs operating system, support services, and application programs. The system also includes a neutral subsystem that is in communication with the enterprise asset subsystem and is used to set up and run at least one exercise scenario, and score performance of enterprise asset defenders in defending the system against exploits. Exploits are launched by an exploitation subsystem communication with the enterprise asset subsystem.

Embodiments of the system further include a computer program product for training computer network defense. Modules for exercise coordination, control, and exploitation can be distributed across a network. The exercise control module assists a user in establishing a scenario for the training The controller module tests targets platforms, administers training in accordance with the exercise scenario, scans for scoring information, tests for the presence of vulnerabilities, and display results to users. The exploitation module is operable to launch modified exploits against enterprise assets.

Further embodiments of the invention provide a method for training computer network defense, where in the first phase trainees are instructed in proactive measures for protecting a network. In a second phase trainees, instruct trainees in aspects of exploits and allow trainees to assess the network, clear it of exploits and implement proactive measures; and in a third phase, launch exploits, score trainee responses to exploits, and provide feedback to trainees regarding scores.

BRIEF DESCRIPTION OF THE FIGURES

Each figure is exemplary of the characteristics and relationships described thereon in accordance with embodiments of the present invention.

FIG. 4 illustrates a trouble ticket creation window.
FIG. 16 illustrates an updated trouble ticket window.

DETAILED DESCRIPTION OF THE INVENTION

Figure 1:
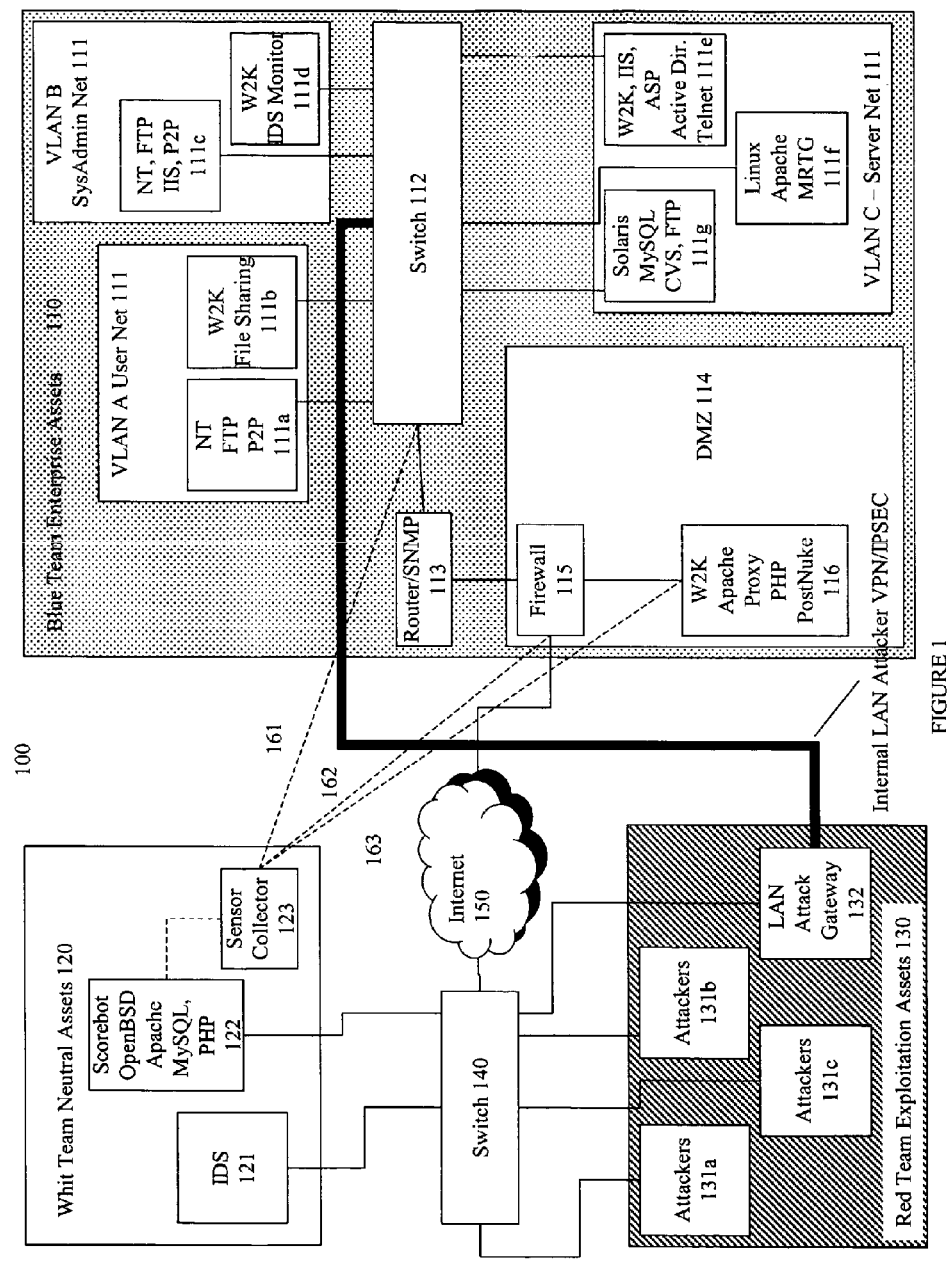
FIG. 1 is a block diagram illustrating relationships between elements of a system of the invention.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. While best mode is described, not all embodiments contain all features described herein. The individual features described herein relate to an exemplary composite of various embodiments of the invention.

There are many possible means for defending against threats to IT systems; whether such threats are launched by an insider or by a hacker in cyberspace. Existing approaches to training IT staff in defending against such threats do not often offer realistic exercise environments in which to train reconfigurable targets. Typically no formalized and repeatable mechanism is provided to conduct routine exercises and assess staff and network performance over time.

An effective means for protecting computer networks is to ensure that an enterprise's IT staff is armed with the technical skills and practical experience to recognize the indicators of, and defend against such threats. It would be beneficial that such training occur in an environment at least similar to the everyday operational environment encountered by the IT staff, and against threats likely to be encountered in the operational environment. In addition, it would be beneficial for the IT staff to learn to work as a team, administering and coordinating the many functions of computer network defense.

There are at least two obstacles to training a team on live data in an environment similar to their operating environment. First, the cost to send an entire IT staff off-site—either the direct cost, or the cost of not having sufficient IT staff on duty during training. Second, running live exploit training on an operational network not only is risky due to potential service outages causes by training scenarios, but the enterprise also may experience reductions in network performance and responsiveness to customers.

Embodiments of the present invention train IT staff to, e.g.: identify vulnerabilities and lock down systems (e.g., networks, servers, and workstations); configure router policies; configure and monitor host-based and network-based IDS; recognize hacker/computer misuse activity; and properly respond to hacker/computer misuse. Each of these activities should be conducted in accordance with the enterprise's security policy.

Some embodiments of the invention are self-contained, e.g., they do not connect with customer's network. This approach mitigates disruption of customer operations while providing realistic training. Systems of the invention can be configured to provide network architecture representative of the customer's IT infrastructure; for example, by using standard UNIX and Windows devices and software.

Real-world, live exploitation scenarios implemented by embodiments of the invention include exploit types such as: Simple Network Management Protocol (SNMP) shutdown via samba, Hypertext Transfer Protocol (HTTP) exploits and defacement; router reconfiguration; Secure Shell (SSH) exploits and shutdown; File Transfer Protocol (FTP) open traffic; Microsoft Windows® worm; and Hypertext Preprocessor (PHP) exploits. Some scenarios implement recognized vulnerabilities such as the 2003 SysAdmin, Audit, Network, Security (SANS) Institute/Federal Bureau of Investigation (FBI) Top 20 List; common misconfigurations such as default accounts and passwords, and common vulnerabilities such as buffer overflows, race conditions, worms, and viruses. Some embodiments employ cyber attacks such as enumeration, discovery, and port scanning using Request For Change (RFC)-compliant Internet Control Message Protocol (ICMP) packets and Transmission Control Protocol (TCP) and User Datagram Protocol (UDP) connections. In preferred embodiments, the exploits are rendered relatively harmless. While services may be disabled by an exploit, the exploits are modified so that no unrecoverable or uncontrolled damage occurs.

Beyond comprising one or more threat scenarios, each system exercise can include exercise controls such as rules of engagement (e.g., a list of what testing may/may not include, stop test procedures), exercise objectives, measures of performance, target configurations, and a communications plan. The exercises are configured to be repeatable, e.g., targets can be reset to an original state and exercise repeated—allowing meaningful comparison between results from one session to the next. Each exercise can train a plurality of trainees.

Embodiments of the invention allocate system assets to teams. FIG. 1 is a block diagram of a system of the present invention illustrating a set of relationships between assets. Other architectures and configurations are possible within options known to those skilled in the art.

A Blue Team comprises IT staff trainees and is allocated enterprise assets 110 to train on and to protect. For example, the Blue Team can be responsible for target systems and network defense; to review initial system configurations to verify that machines are properly configured and patched against vulnerabilities; to monitor and manage network and host-based systems using intrusion detection systems (IDS) and forensic inspection as necessary; to monitor and manage network and host-based systems to thwart active threats; and to report computer misuse to operational staff.

For the Blue Team, network priorities are availability and security. Network services should be maintained operational, in accordance with the security policy; some services will be assigned higher priority according to the exercise scenario. In many embodiments, the Blue Team is not allowed to "hack back" to points outside of the firewall. Similarly, Blue Team members are not allowed to modify administrative users, e.g. White Team users. Internet Control Message Protocol (ICMP) pinging must be allowed within the internal network and to external devices, other than the firewall. Blue Team use of automated patching tools (i.e. Up2date, Windows "Automatic Updates" service, etc.) is not allowed in most embodiments except for identified client machines. Patches are provided by the trainers based on reasonable Trouble Ticket requests. In most embodiments, Blue Team members must follow the guidelines set forth in the appropriate organization network security policy for securing the enterprise assets 110.

A Red Team comprises trainers with exploitation assets 130 configured to exploit enterprise assets 110. The Red Team is responsible, for example, to simulate the hacker threat by attacking enterprise assets 110 (using methods such as deployment of malware that has been rendered substantially harmless), and to follow sequence of events as prescribed by an Exercise Director, e.g., a White Team member.

A White Team comprises trainers with neutral assets 120 to control and score an exercise. In addition, White Team members are responsible for initial target system configuration and providing training and feedback during the exercise as appropriate, and at a debrief. The White Team is further responsible to ensure flow of exercise mirrors real-world operations as closely as possible.

Conventional network communications between Red, White, and Blue assets are through networking devices Switch 140 (and thru the Internet/Switch 150 for remote training) When configured for remote training, some embodiments of the present invention allow access from terminals on an operational network (e.g., the client's network), but access to the assets of the operational network is prohibited, e.g. creating a virtual private network for assets of embodiments of the invention. Secondary communications for the White Team to gather scoring data are through ports and probes 161, 162, 163. For example, port and probe 161 are mirrored ports and a probe on the internal network side of the Router 113. Probe 162 is connected to the external side of the firewall 115 while probe 163 examines network assets in the "demilitarized zone" (DMZ). In some embodiments, the Red Team is given a dedicated attack path 170 to the enterprise assets that typically would not exist in the customer's actual network. In other embodiments, the Red Team has physical access to the Blue Team assets, e.g., switch 112.

In many embodiments, enterprise assets 110 include network devices such as routers, switches, etc., security devices (firewalls, IDS, etc.), servers (Windows NT/2000, Linux and Solaris); workstations (Windows NT/2000), and a system administrator web server 111c with software and explanations to properly configure enterprise assets 110. In many embodiments, one system 111d on the SysAdmin Net is dedicated and manned to monitor the IDS and System Status Board—described below.

In addition to a DMZ 114, router 113, and switch 112, in FIG. 1 enterprise assets 110 comprise a series of logically grouped hosts (referred to herein as "VLAN") VLAN A 110a, VLAN B 110b, and VLAN C 110c. Grouping in this fashion provides administrative separation between network cells as though they were physically separate switches. A DMZ is a portion of a network area that sits between an enterprise's internal network and an external network. It allows hosts within the DMZ allows to provide services to the external network, while protecting the internal network. In FIG. 1, a DMZ host 116 is running Microsoft Windows® 2000 (W2K) operating system, Apache web server, a proxy server, and server applications in open source PHP and PostNuke environments. In other configurations, enterprise assets can include other types of network devices and data terminal equipment know in the art, e.g., bridges, gateways, hubs, modems, multiplexers, etc. The enterprise network can be configured to reflect the makeup of a customer's enterprise network.

Each VLAN comprises hosts 111a-111f running a variety of operating systems such as Microsoft Windows® 2000, Windows NT, Solaris, and Linux; along with a variety of applications such as file transfer under the File Transfer Protocol (FTP), file sharing, database management (e.g., MySQL), web servers and extensoins (Apache, IIS, ASP), a software development configuration management system (CVS), portions of an intrusion detection system (IDS), a Multi-Router Traffic Grapher (MRTG) network utility, terminal emulation software (Telnet), and directory services (Active Dir.).

Figure 2:
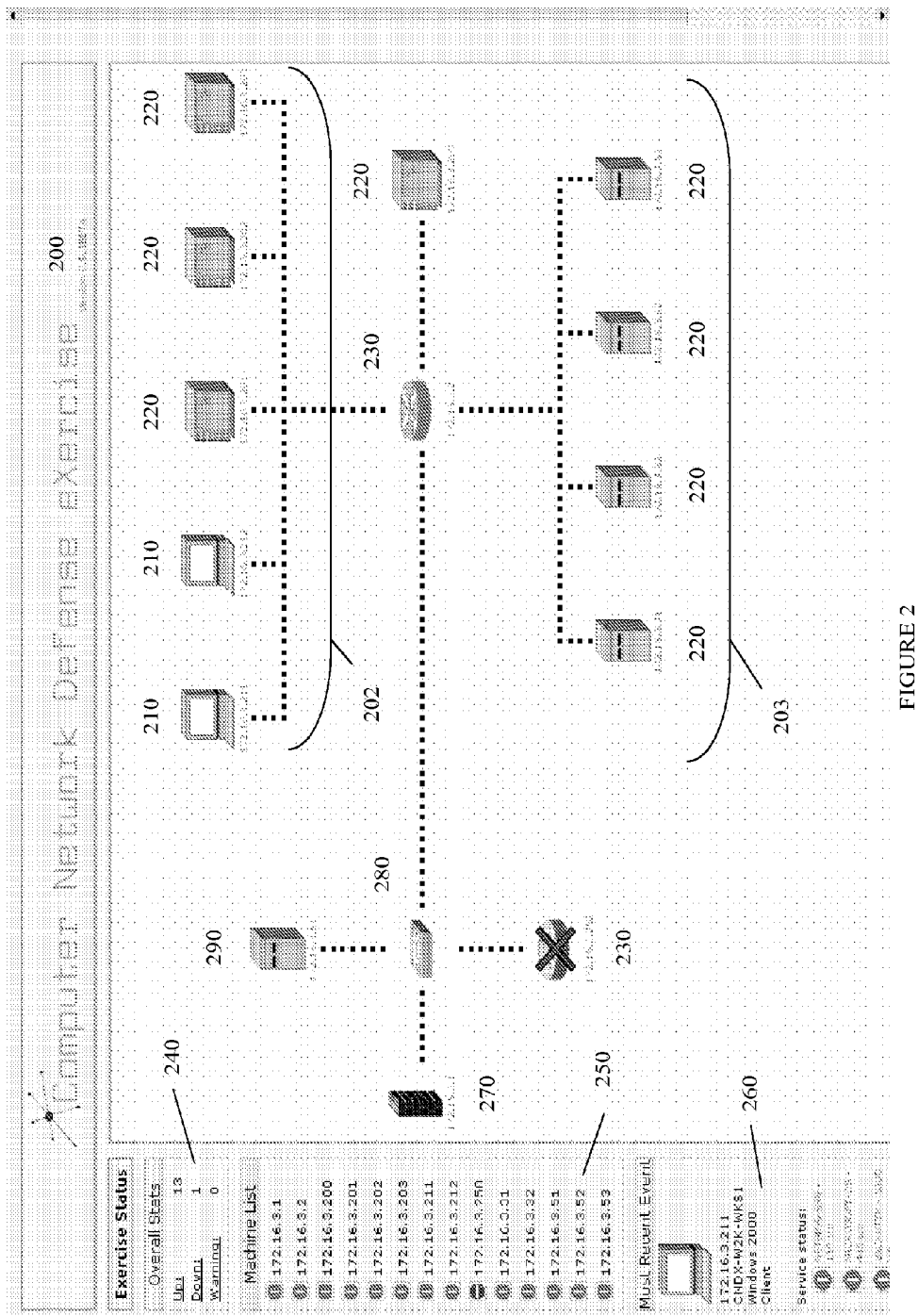
FIG. 2 illustrates an exercise status window.

Referring to FIG. 2, an interactive exercise status window for enterprise assets is shown. A firewall 270 is shown controlling access to external networks. A hub 280 connects the firewall 270 to a router 230 (shown as "down" by the "X" across the router icon), a server 290 configured as a DMZ host, and a router 232. The router 232 serves two VLANs 202, 203, and a standalone server 220. VLAN 202 comprises workstations 210 and Servers 220. VLAN 202 comprises a series of workstations 220.

In addition to displaying up/down/warning status graphically, e.g., "down" corresponding to an "X" displayed over the network device icon, "warning" corresponding to an exclamation point "!" being displayed over the icon, summaries of overall status 240, machine status 250, and most recent (including service status for monitored services) 260 is shown in the left portion of the screen. For the display of FIG. 2, status for fourteen network devices (the hub is unaddressed) is shown as "Overall Stats" 240. The Machine List 250 confirms this status by showing router 172.16.250 as down by displaying a horizontal bar next to its address; up devices display a vertical bar adjacent to the address.

Figure 3:
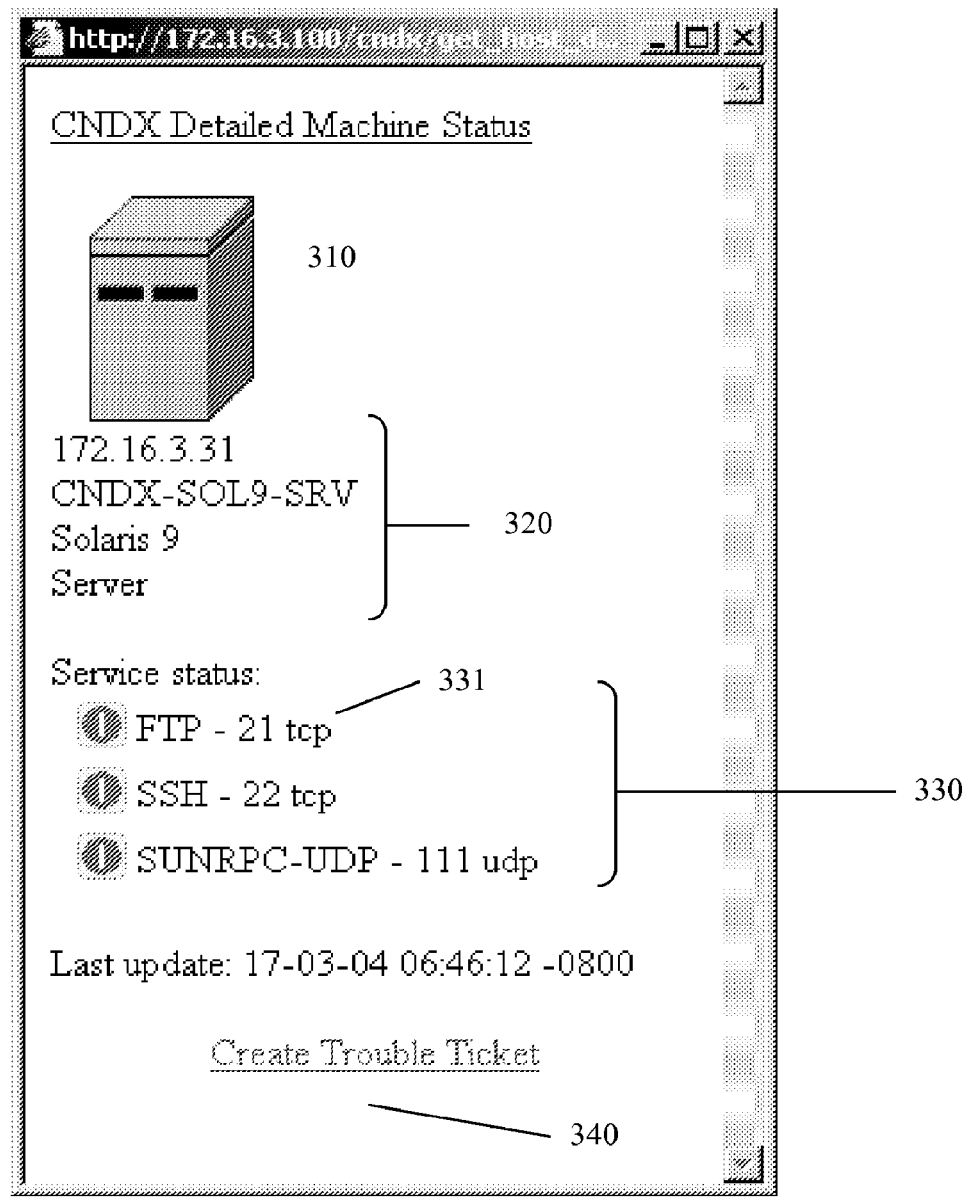
FIG. 3 illustrates a detailed machine status snapshot window.

By clicking on a specific node on the screen, or on the list of nodes on the left hand side of the screen, the trainee can get more in depth information about the node (see FIG. 3). If changes are made to the host or a problem is noticed, the trainee can select "Create Trouble Ticket" to report the problem (FIG. 4).

Referring to FIG. 3, a detailed machine status window 300 of the current invention is illustrated. The window 300 describes the status of a node identified by its icon 310, its label 320 (including IP address, machine name, operating system, and role). In addition, the status of services monitored by embodiments of the invention 330 is also shown, e.g., in FIG. 3 file transfer (FTP) service 331 is shown as available. A link 340 near the bottom of the window 300 leads to the trouble ticket window 400 illustrated in FIG. 4.

Referring again to FIG. 1, exploitation assets 130 available to the Red Team include at least one host 131a-131c configured to launch exploits against the enterprise assets and a host configured as a local area network (LAN) attack gateway 132. Both attackers 131 and the LAN attack gateway 132 have conventional access to the enterprise assets via switch 140, Internet 150, and the enterprise firewall 115. The LAN attack gateway also has access to all hosts visible on the enterprise network 110 via the enterprise network switch 112, thereby bypassing the firewall.

Neutral assets 120 include one or more hosts 122, 122, 123 running on the open source OpenBSD operating system. OpenBSD is a multi-platform BSD-based UNIX-like operating system with special features for security. Applications for controlling and scoring the exercises are run on this host, including an application that uses the Apache Web Server and Php Server to display the current statistics for the Blue Team, storing the data in the MySQL database with web interfaces for the teams to for scoring, status, and trouble tickets. In some embodiments, the IDS is deployed as a Blue Team asset and is available as an attack target for the Red Team. The Sensor Collector can be implemented as a process within the scoring process.

Neutral assets include computer program products for controlling and scoring system exercises. In some embodiments, a Controller Perl Script reads a list of Target IP addresses provided by the Exercise Coordinator at start up, and pulls relevant Target information from the backend target database running on MySQL. Target information includes critical services and vulnerabilities for each host as well as relative point value.

The Controller creates Perl scripts on-the-fly to test Target Platforms. In addition, the Controller executes Perl scripts that scan for scoring information. If a target host is alive, the target host is checked to see if specified services, e.g., critical services are available. In addition, the Controller tests targets for vulnerabilities. Scores are collected in the neutral asset MySQL database for target dead/alive, service up/down, and vulnerabilities found. A scoring Perl script reads scan results from the MySQL database and calculates scores (group— e.g., Windows, UNIX, etc.; and individual). The script displays scores in graphical format via a system http: site to show how well the network defense team (Blue team) performs over time.

Figure 8:
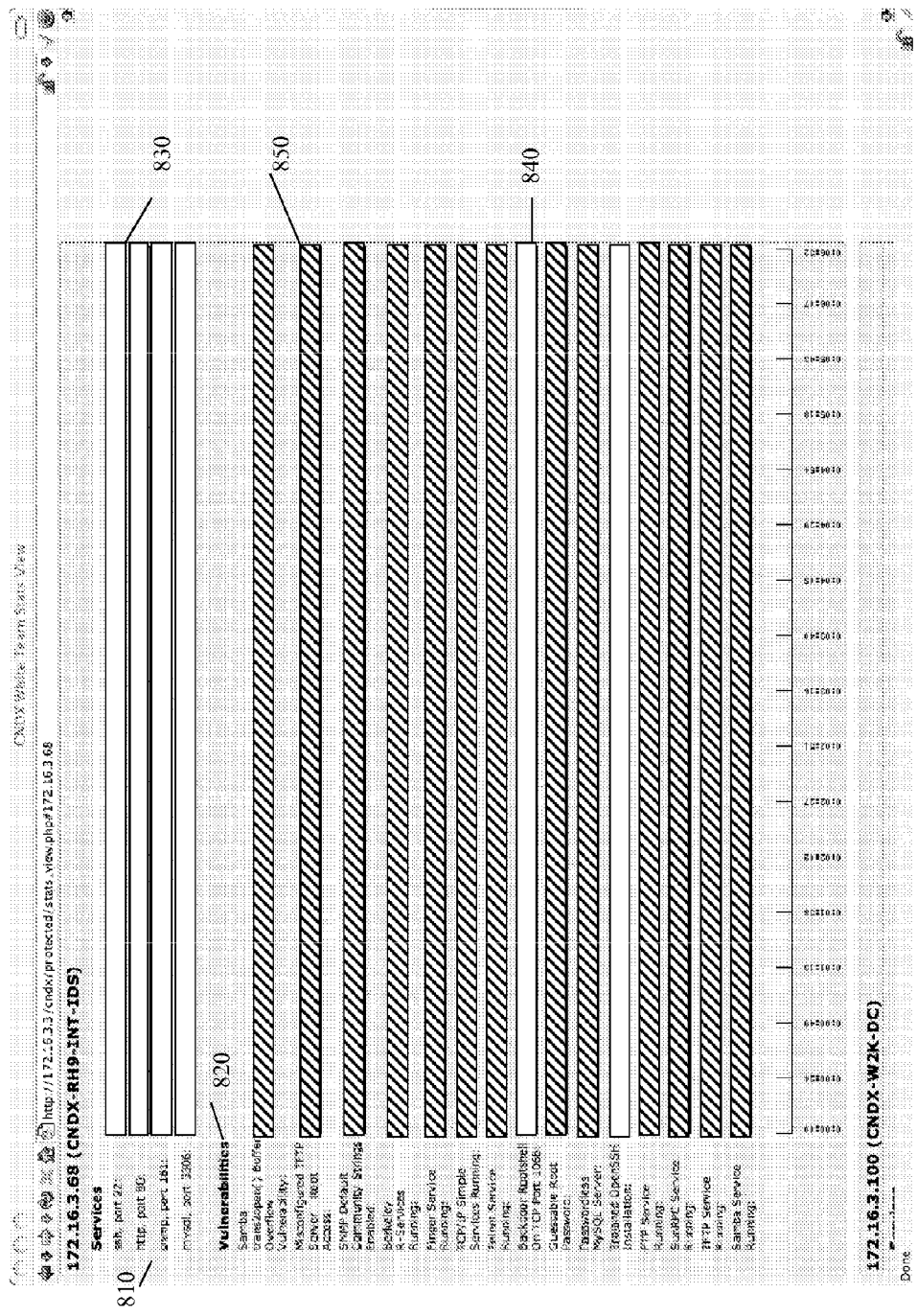
FIG. 8 illustrates a services and vulnerabilities timeline.

Embodiments of the invention keep track of the Blue Team's progress by monitoring the target systems and services to determine if any services or systems are not operational and whether any vulnerabilities exist. This information is displayed in a time-based graphical form as shown in FIG. 8. With reference to FIG. 8, services 810 and vulnerabilities 820 are shown as either black (the resource/platform for the service is not available; or vulnerability status is indeterminable), red (the resource/platform for the service is available, but the service is down; or vulnerability is valid), or green (the service is available; or the vulnerability is mitigated). The colors indicating red and green are shown as cross-hatch and white respectively in the Figures. This display is also monitored by the Red Team as one basis to determine which attacks to perform. It should be noted that embodiments of the invention can report total system performance as well as by either system types (i.e. UNIX, Windows, Security and Network Devices), or by each individual system.

Trainees are evaluated in two ways in some embodiments: quantitatively and qualitatively. These methods will apply both objective (automated scoring) and subjective (evaluator scoring) scoring criteria to help the trainees to evaluate their strengths and weaknesses in defending enterprise assets. Quantitative factors include: time from initiation/start of exploit to time detected; time from exploit detection to time corrected; effective triage according to priority of service; percentage of exploits detected; percentage of exploits corrected; mean/median time for exploit detection; mean/median time for exploit correction; and mean/median number of services down. Qualitative factors include: ability to effectively report incidents; apparent understanding of impact of downed services; apparent knowledge of student to detect and fix vulnerabilities; apparent knowledge of student to use detection/monitoring systems.

Figure 5:
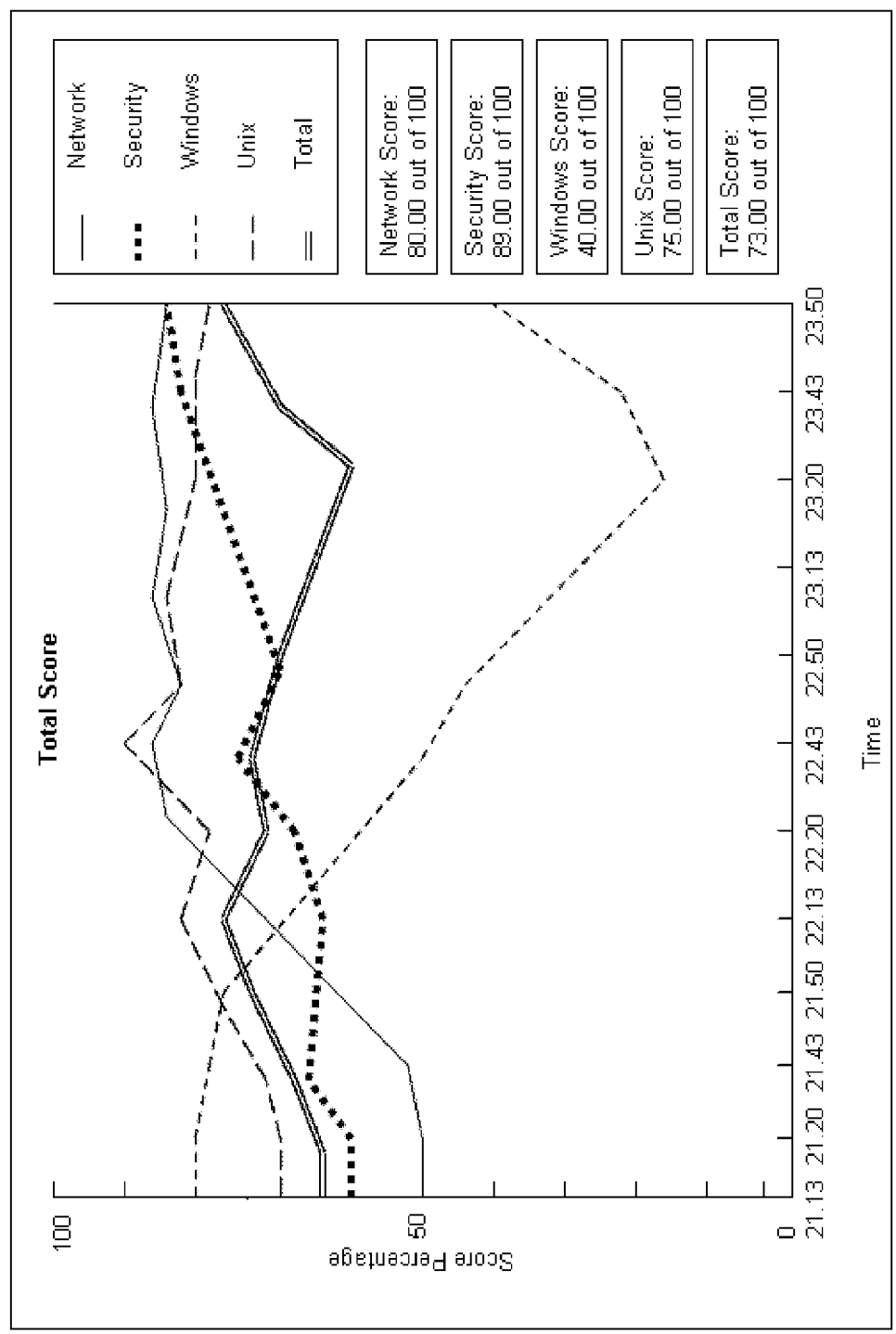
FIG. 5 illustrates a scoring timeline.

FIG. 5 depicts a score over time based on the above mentioned factors, showing components for Network status, network security, operating system status (both Windows and UNIX), along with a total score.

In some embodiments, the scoring software 122 provides real-time feedback of student's progress by measuring: system configuration data, system vulnerability data, student response to incidents; and vulnerability exploit results. In typical embodiments, the measurements are taken every 45-60 seconds with results stored in a back-end database; other measurement periodicity appropriate to the training environment and operational environment can be used.

Scoring data is used during exercise by White Team to identify weaknesses in performance and then adapt training in response. Scoring measures the ability of network defenders to: maintain critical systems and services (availability); detect and mitigate vulnerabilities, and react to threats (i.e., hackers, abusers, etc.).

Some measures of performance that can be used include: time to detect system vulnerabilities; time to detect exploit from exploit initiation; time to correct exploit from exploit detection; time to complete incident handling; percentage of exploits detected and correctly diagnosed; percentage of exploits corrected; and percentage of services impacted. Performance Criteria include the ability to: lock down hosts; properly configure network devices; maintain network devices; detect computer misuse; correct misuse in timely manner; and work as a team. Qualitative aspects are also used in assessing Blue Team performance.

Scoring and evaluation is implemented in real time as a computer program product across a plurality of platforms. It provides for automated analysis of man and machine, tracks multiple values over time, permits trend analysis, and allows evaluation against best practices. In some embodiments, exploits are launched from Red Team platforms.

In a physical implementation of an architecture such as the one described above, hosts are implemented on blade servers mounted in roll-away 21U chassis. Blade servers are housing for individual minimally-packaged hosts, switches, routers, and other network devices ("blades") that typically provide their own processors, memory, storage, and network connections, but share common cooling and a power supply built into the chassis.

The enterprise asset firewall 115 is a Cisco PIX 515 firewall, and the enterprise switch is a Cisco 24-port switch. Blades, switches, routers, and other network assets for all teams, along with integrated power filtration, are installed in man-portable chassis, e.g., roll-away 21U sized chassis, for deployment at a customer's site.

In some methods of use of the invention, three phases of training are used. Prior to Phase I, the system topology is configured in a manner as described above by example; exercise controls and teams are established. In Phase I, instructors cover proactive measures for protecting a network, e.g., "best practices" for identification and mitigation of system vulnerabilities, installation and verification of security patches, identification and eradication of "back doors"; configuration of security devices such as firewalls, routers, and switches; and installation and configuration of intrusion detection systems.

In Phase II, various aspects of live exploits are described, such as the effect of the exploit, protection from the exploit, detection of the exploit, assessment of damage from its presence, mitigation of further damage, and collection of evidence. The trainees are then allowed to assess the present Blue Team network, clean it, and implement proactive measures. An example syllabus for Phase I and Phase II includes: exercise overview, general security fundamentals, windows security, UNIX security, SANS Top 20 vulnerabilities, toolset overview, IDS and firewall configuration fundamentals, and basic IT forensics.

In Phase III, Red Team members run exploits against the system, scoring proceeds (e.g., as described above), and feedback is given to participants. In addition to exploits described above, security testing may include attempted logins using guessed and discovered account names and passwords; network sniffing, traffic monitoring, and traffic analysis; use of exploit code for leveraging discovered vulnerabilities; password cracking via capture and scanning of authentication databases; spoofing or deceiving servers regarding network traffic; and alteration of running system configuration. Feedback can take the form of a preferred timeline of responses to the scenario.

Figure 6:
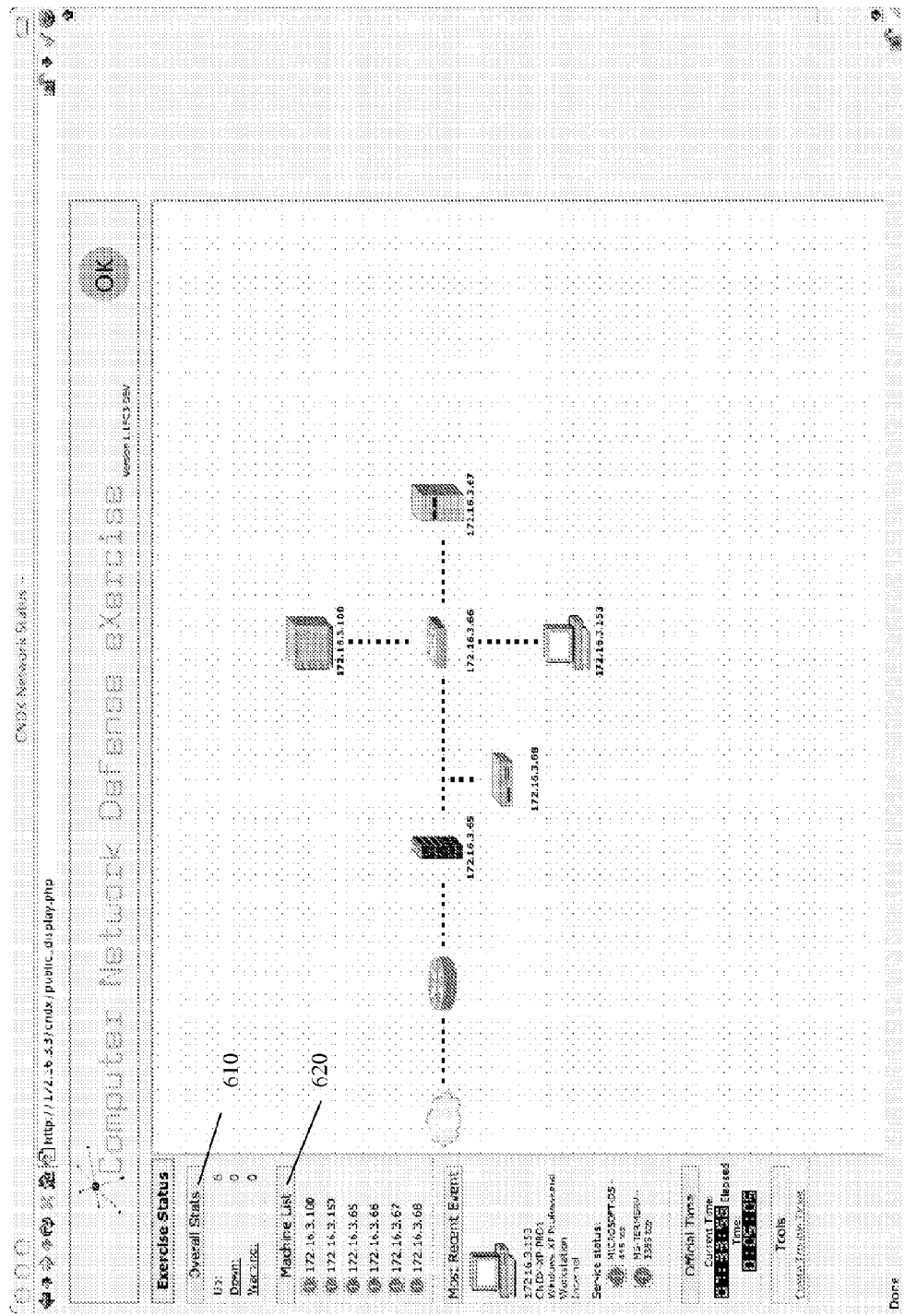
FIG. 6 illustrates an exercise status window.
Figure 7:
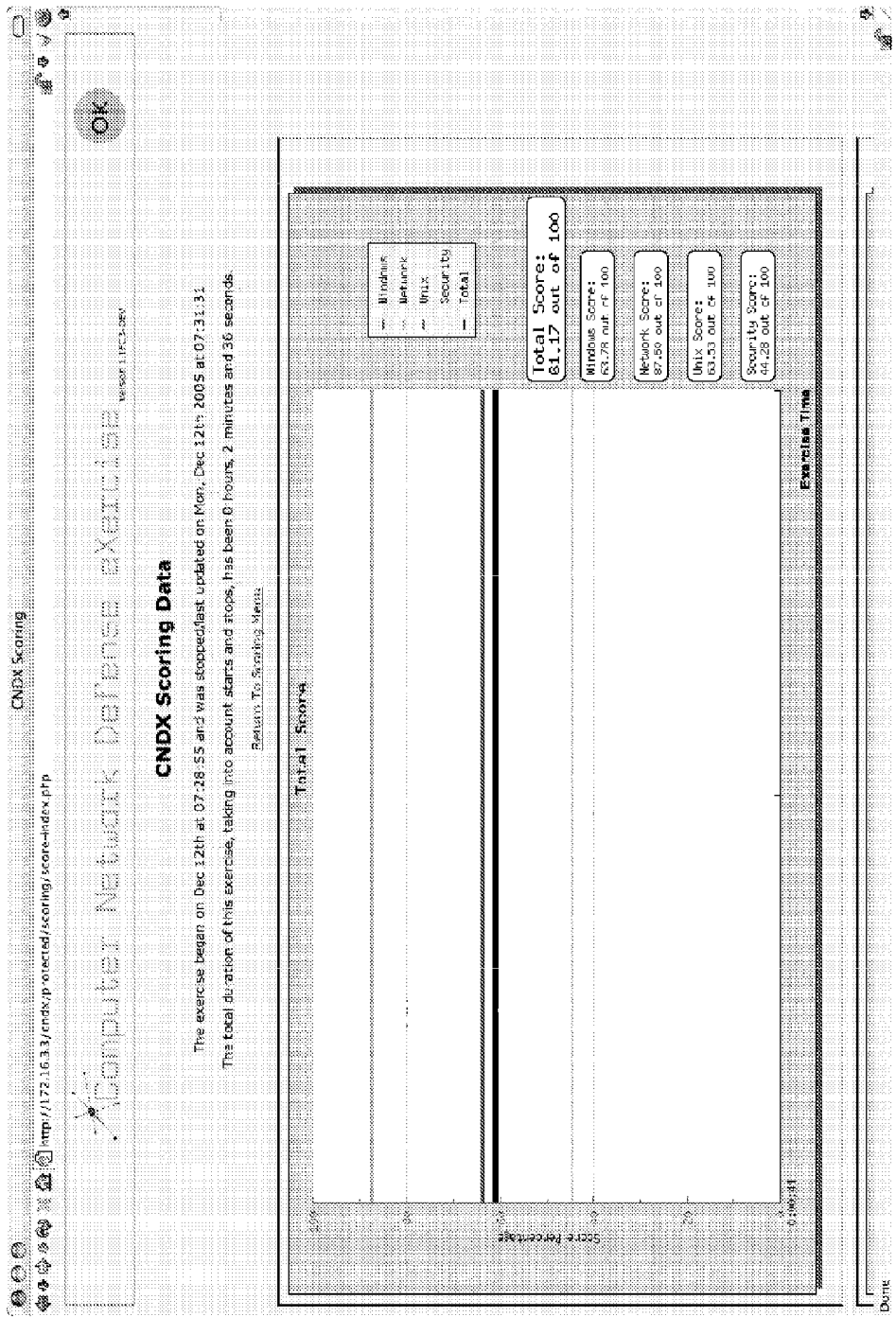
FIG. 7 illustrates a scoring timeline.

At the start of an exemplary simplified Phase III, Blue Team enterprise assets are quiescent, with no attacks being launched by the Red Team and no changes having been made from the initial configuration. Monitoring view for the Blue Team would look normal as shown in FIG. 6. Referring to FIG. 6, the overall stats 610 and the machine list 620 indicate that each IP address in the network is up. The scoring display (e.g., FIG. 7 as shown after the exercise was concluded) displays a constant value since no changes had been made. FIG. 7 shows less than 100% at the beginning of the exercise because the systems are vulnerable to exploit at that point. A 100% score means that all vulnerabilities are fixed and are services are up/available. The per vulnerability view (e.g., FIG. 8 also as shown after the exercise) shows no changes. In FIG. 8, available services and vulnerabilities not yet deployed are shown as white, e.g., 830 and 840 respectively, though in an operational system of the present invention, green is preferred. Also in FIG. 8, existing vulnerabilities are shown as black, e.g. 850, though in an operational system of the present invention, red is preferred.

Figure 9:
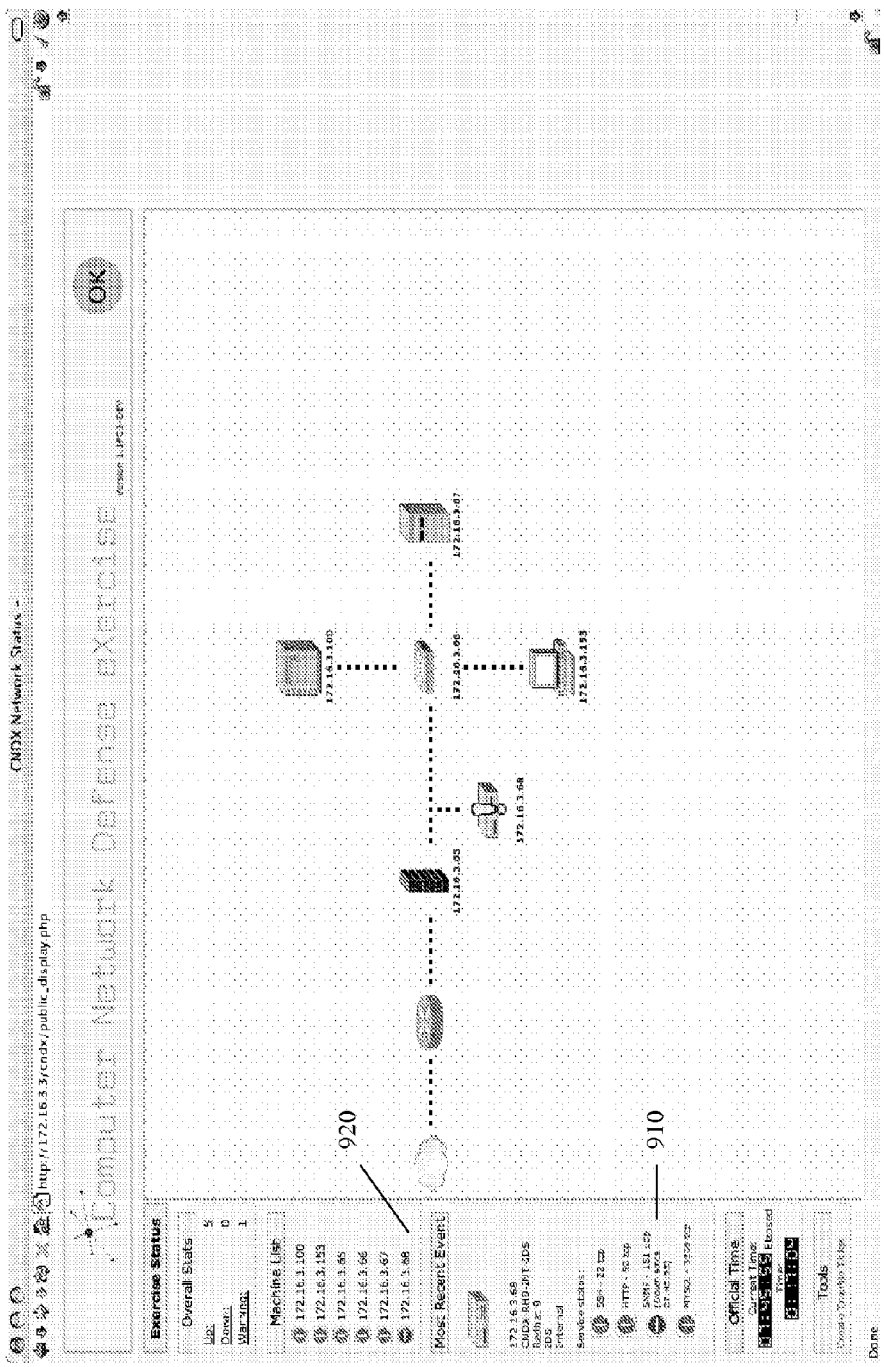
FIG. 9 illustrates an exercise status window.
Figure 10:
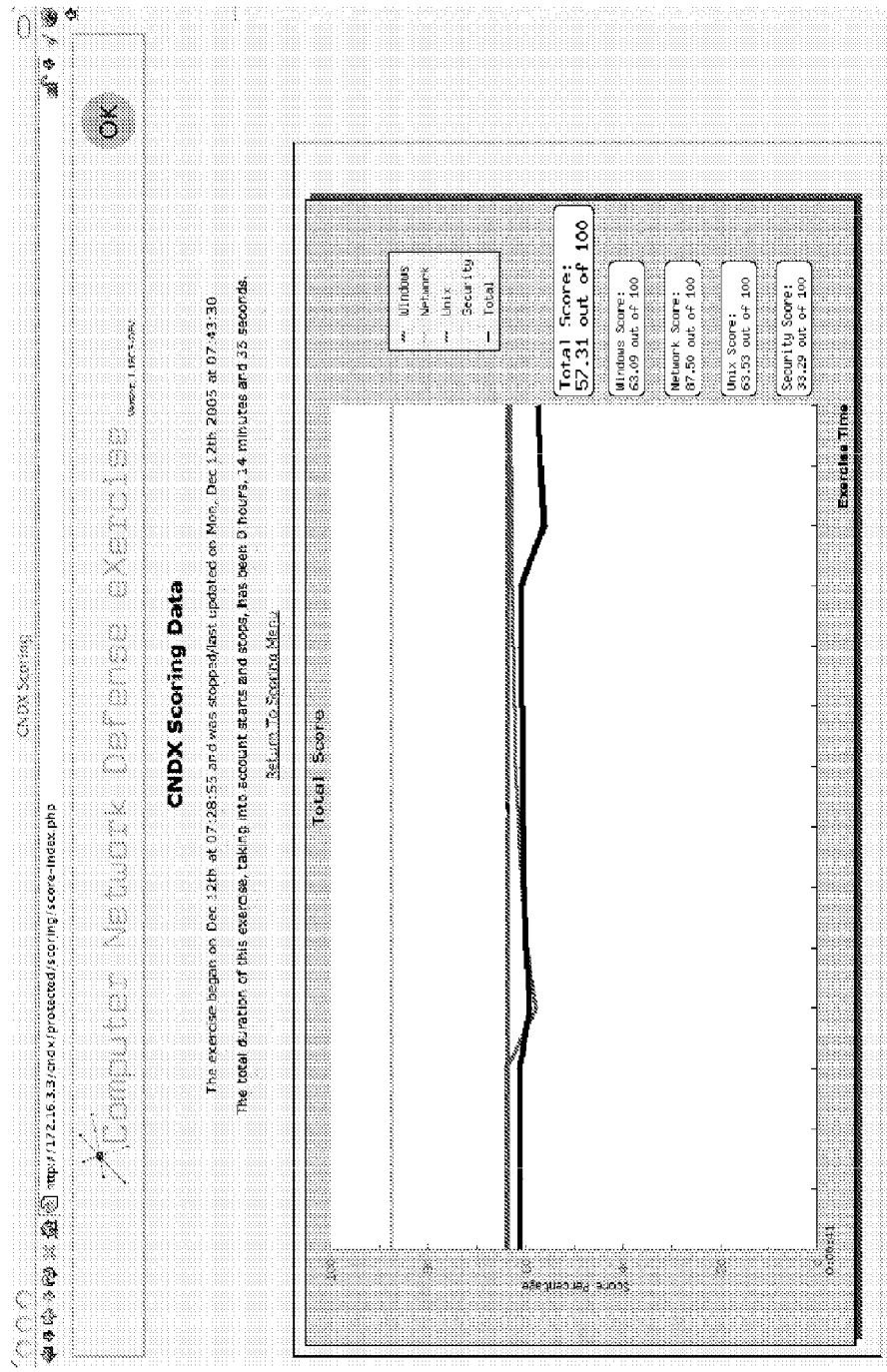
FIG. 10 illustrates a scoring timeline.
Figure 11:
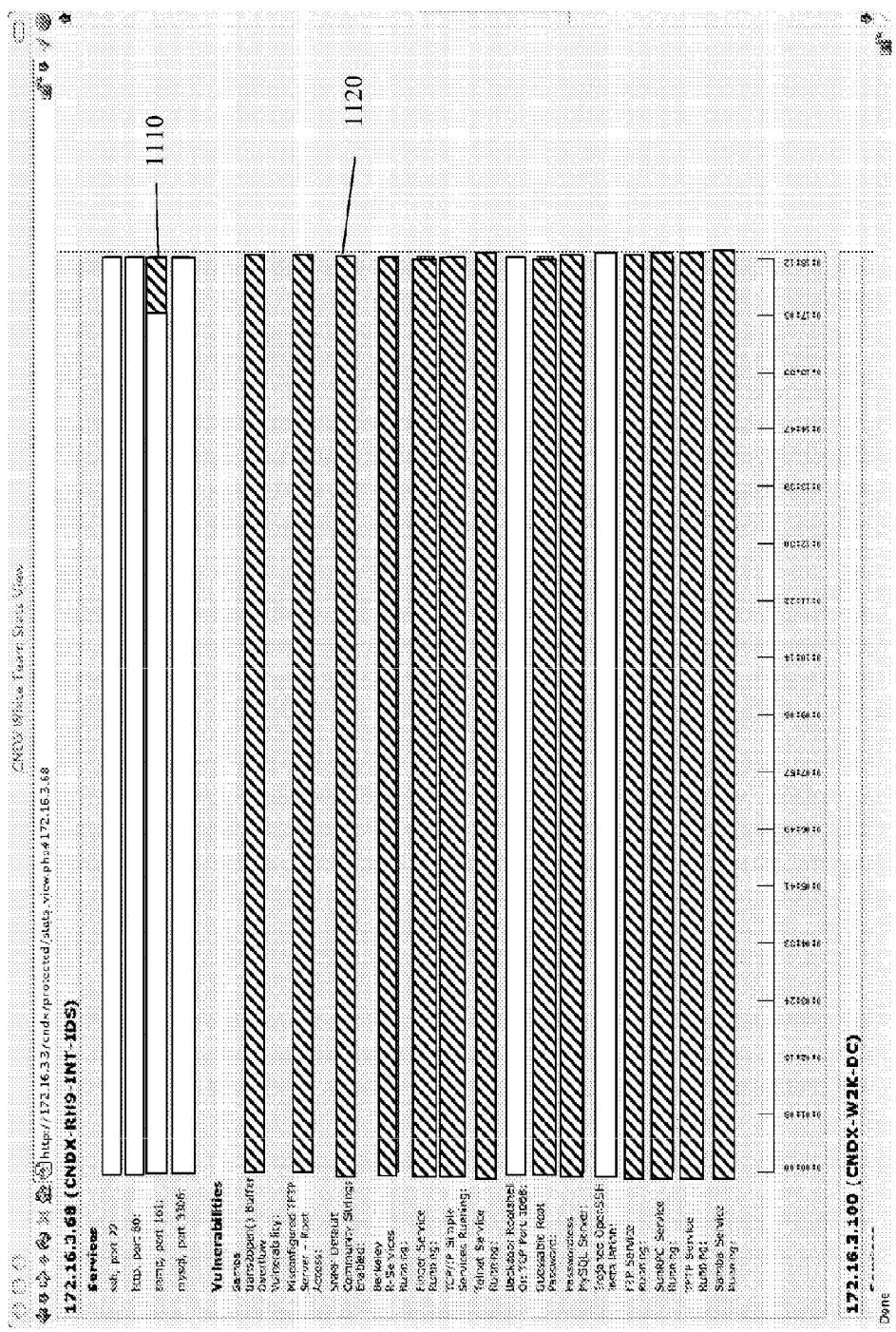
FIG. 11 illustrates a services and vulnerabilities timeline.

Upon the first launch of attacks by the Red Team, the attacker uses an attack script to gain control of a Blue Team host and disables one of the services. Thus causing the monitor system, shown in FIG. 9, to display the loss of a critical service 910 and the status of the host 920. However since the attacker also successfully attacked the Blue Team host, the scoring system has deducted 10% of the current score as shown in the scoring display of FIG. 10, with the change in the service and vulnerability view, FIG. 11, showing a change to the "snmp, port 161" 1110 and to "SNMP Default Community Strings Enabled for the time period 00:17:03 to 0:18:12 1120. The 10% change is reflected in the line graph going down by 10%. In preferred embodiments, the time axis of the scoring view and vulnerability view are both based on total exercise time elapsed.

Figure 12:
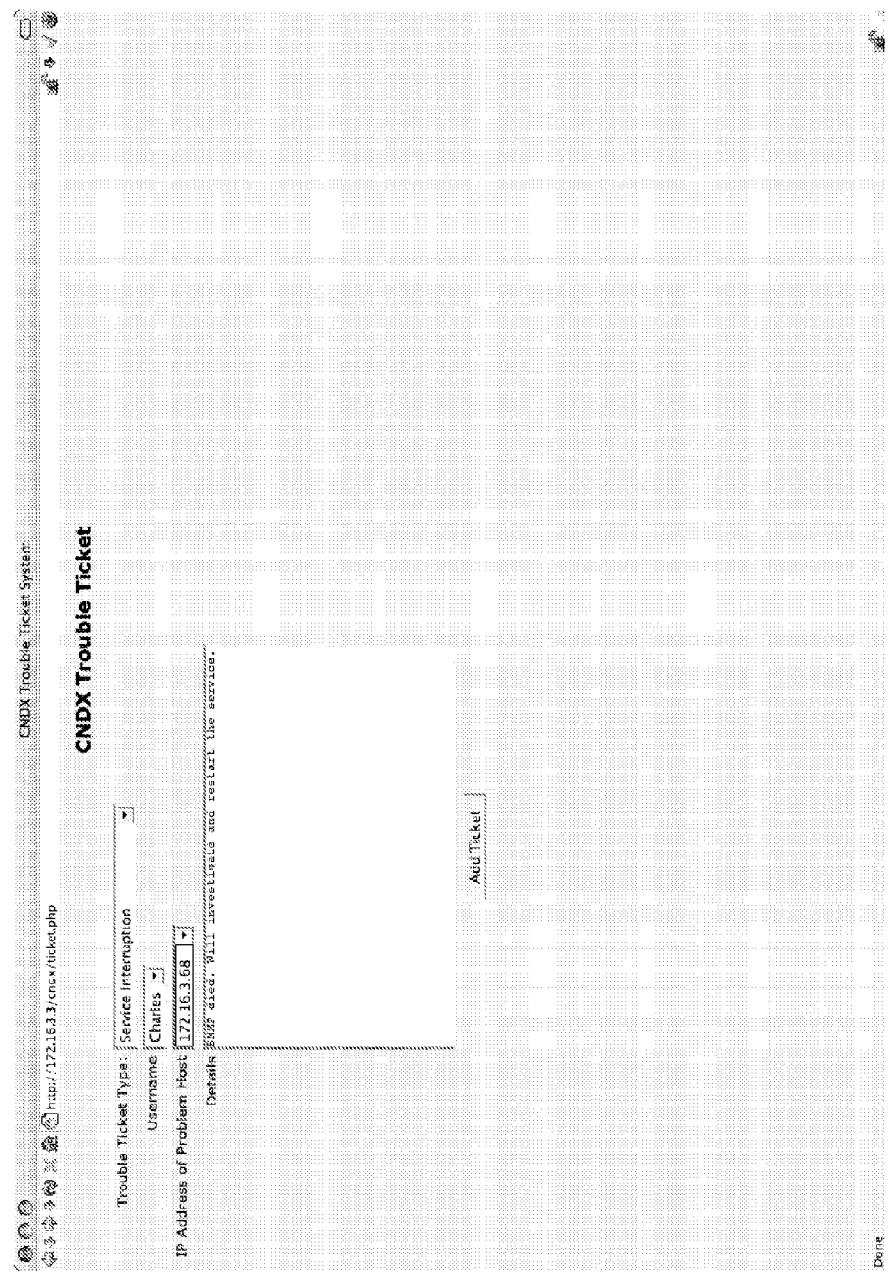
FIG. 12 illustrates a trouble ticket creation window.
Figure 13:
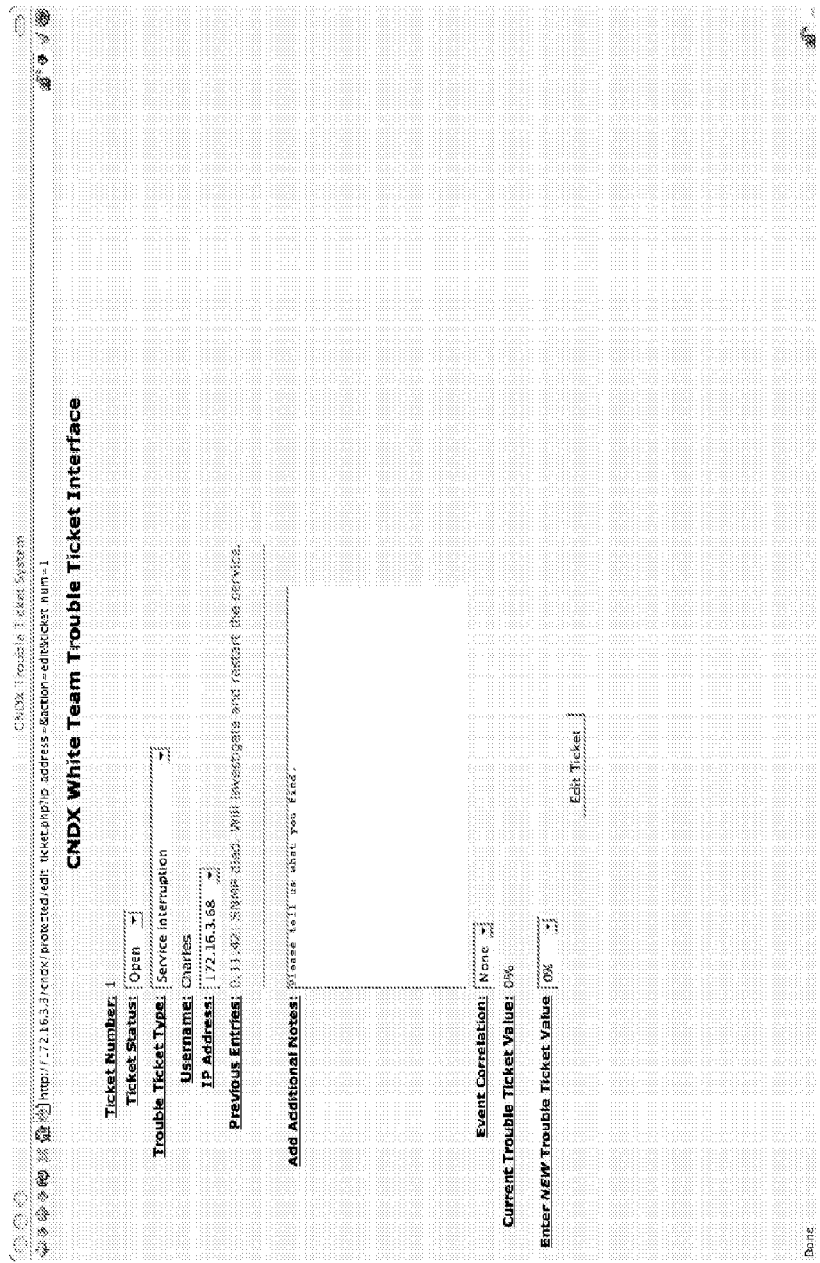
FIG. 13 illustrates a trouble ticket response window.

Once the monitoring system informs the Blue Team of the loss of a critical service (or in the event that the Blue Team becomes otherwise aware of a trouble condition), the Blue Team puts in the trouble ticket, e.g., as shown in FIG. 12, to inform the White Team of the issue. The White Team then responds, e.g., as shown in FIG. 13, to direct the Blue Team to continue their progress with no change in scoring for the non-informational trouble ticket.

Figure 14:
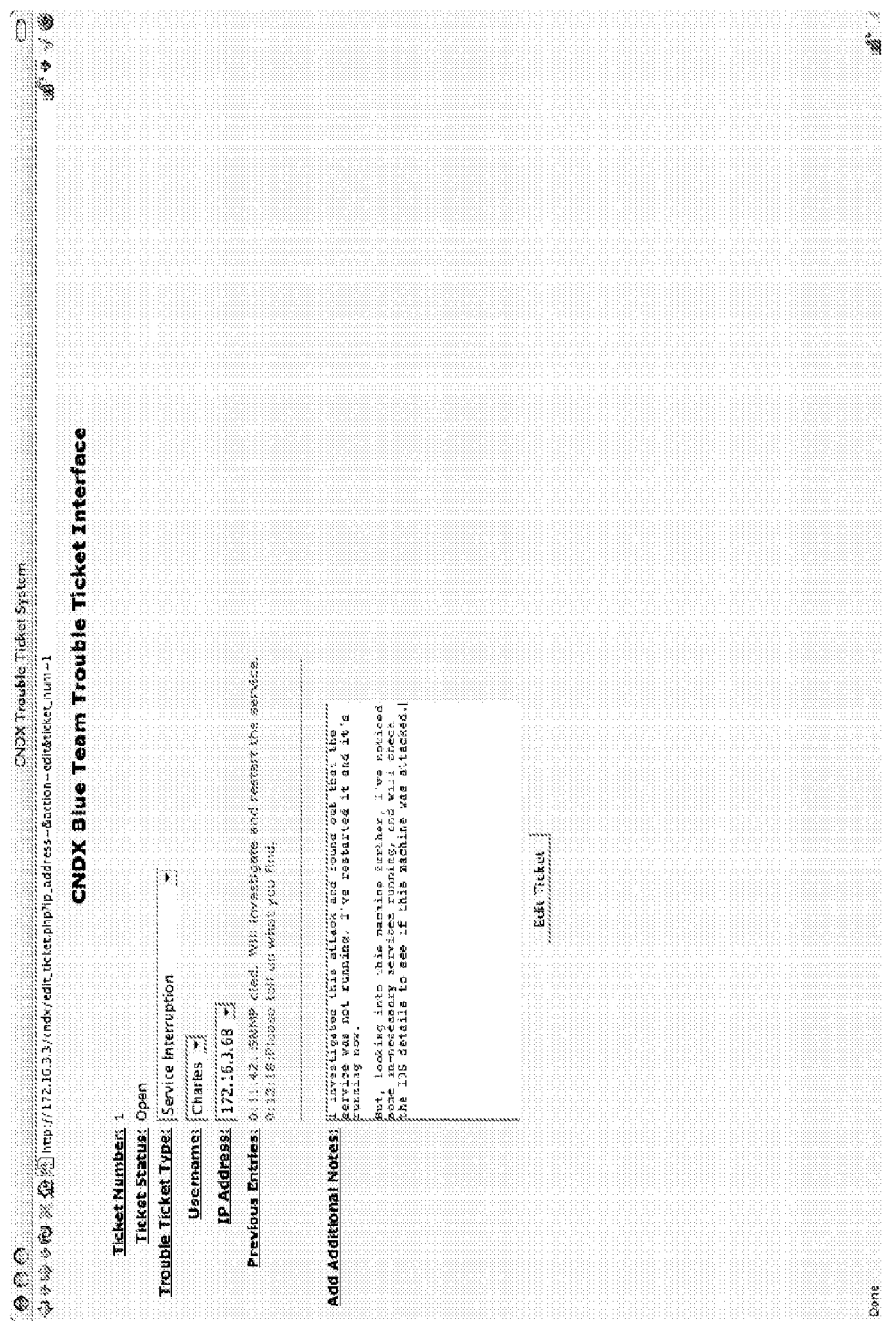
FIG. 14 illustrates an updated trouble ticket window.
Figure 15:
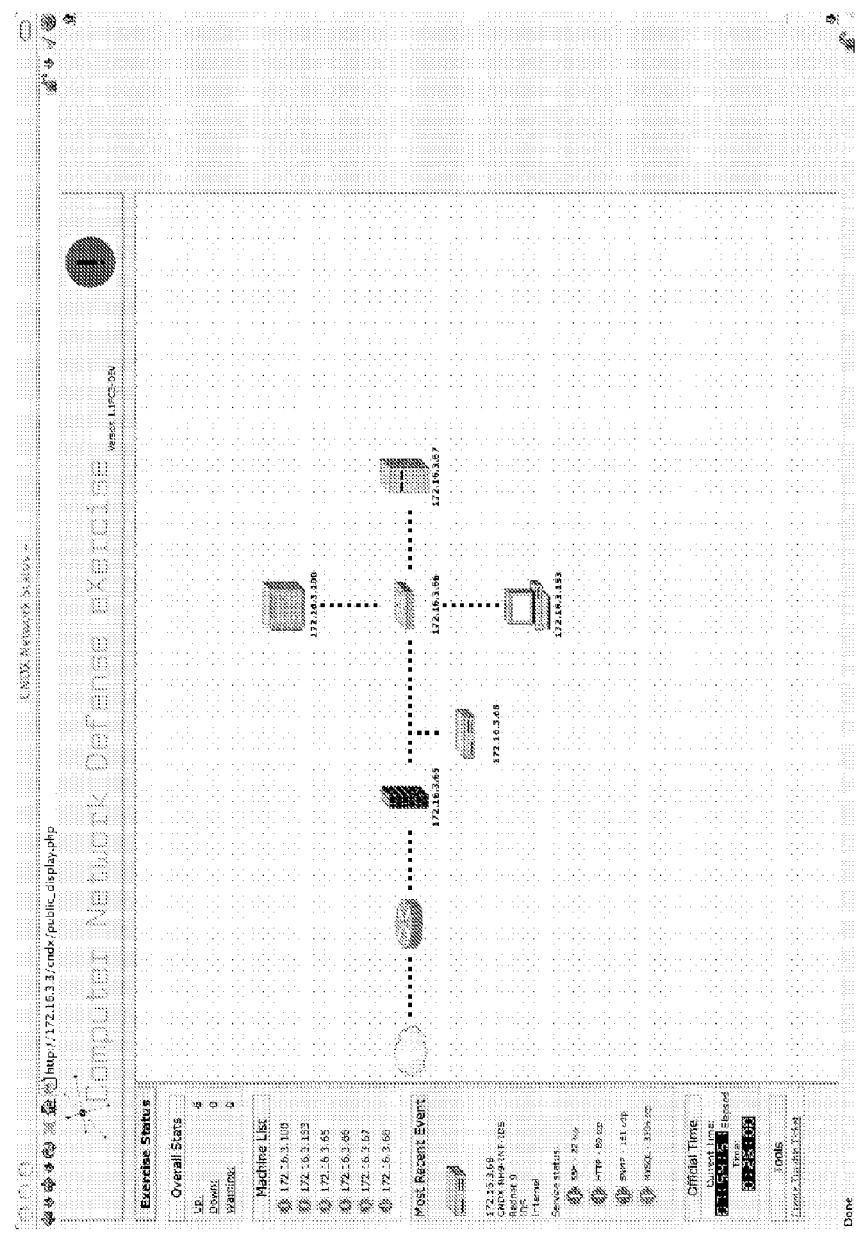
FIG. 15 illustrates an exercise status window.
Figure 16:
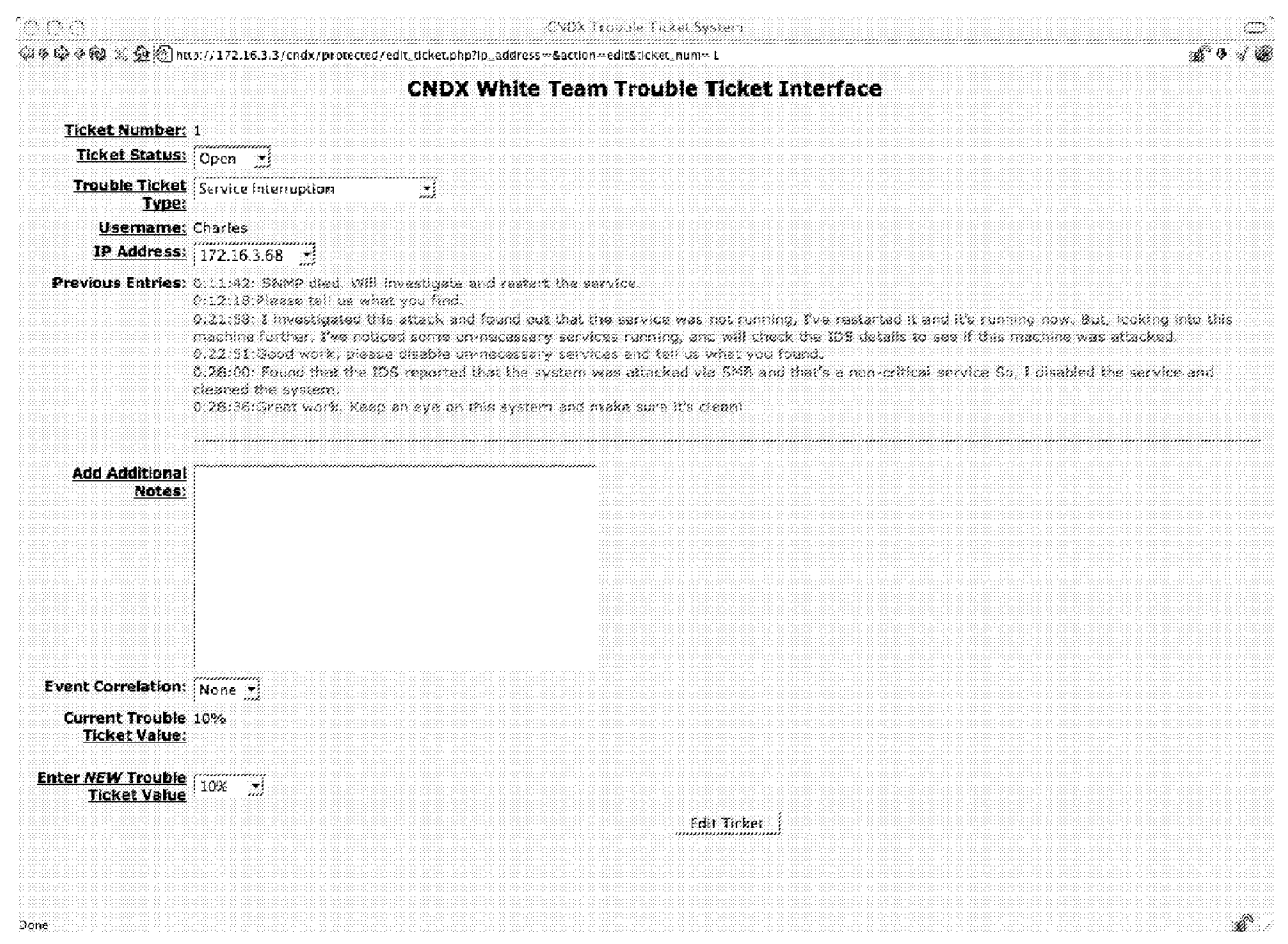

Now the Blue Team is looking to restore their critical service and determine the cause of the problem. The Blue Team connects to the server, restarts the service and enters a trouble ticket, e.g., FIG. 14, to the White Team informing them of their current findings. Once the critical service is restarted the monitoring view would return to it's previously "healthy" display, e.g., FIG. 15. The White Team responds, e.g., FIG. 16, to the trouble ticket and upon receiving the completed response from the Blue Team grants full credit of +10% for their trouble ticket response to the incident.

After the scoring round is complete, the monitoring display shows that the system is back in a healthy state, where as the scoring display shows the changes due to the Red Team actions, the remediation by the Blue Team, and the scoring changes due to correct trouble ticket usage from the White Team. With the vulnerability view for this target displaying an improvement of the specific vulnerabilities fixes by the Blue Team during the remediation of this host.

The invention claimed is:

1. A method for training one or more users of a computer network to defend the computer network, the method comprising:
   establishing communications between at least a first computer including an enterprise asset subsystem, a second computer including an exploitation asset subsystem, and a third computer including a neutral subsystem;
   executing by the enterprise asset subsystem a plurality of virtual enterprise asset programs identical to computer network enterprise asset programs;
   launching by a first subset of the one or more users via the exploitation subsystem of the at least a second computer one or more exploits against at least one of the plurality of virtual enterprise asset programs; and
   monitoring via at least a first computer by the second subset of the one or more users the at least one of a plurality of virtual enterprise asset programs to maintain execution thereof, identifying one or more exploits thereof and attempting to address one or more identified exploits;
   tracking by the neutral subsystem the launching of the one or more exploits and the monitoring of the at least one of a plurality of virtual enterprise asset programs, including the identification of one or more exploits and the addressing of the one or more identified exploits; and
   scoring by the neutral subsystem the first and second subsets of users based on results of the tracking thereby and providing access to scoring results to facilitate the training of one or more users of a computer network to defend the computer network.

2. The method of claim 1, further comprising providing by the neutral subsystem to the first subset of users a predetermined list of vulnerabilities within one of the enterprise asset subsystem and the virtual enterprise asset programs, which the exploitation subsystem should attempt to exploit.

3. The method of claim 1, further comprising providing by the neutral subsystem to the first subset of users a predetermined list of target assets within the enterprise asset subsystem, which the exploitation subsystem should attempt to exploit.

4. The method of claim 1, wherein addressing of the one or more identified exploits includes locking down assets, configuring router policies, and configuring and monitoring intruder detection systems.

5. The method of claim 1, wherein monitoring by a second subset of the one or more users via the first computer of the assets of the enterprise asset subsystem further includes determining operability of each of the assets.

6. The method of claim 1, wherein scoring for the second subset of users includes determining at least two of: time from initiation of exploit to time detected; time from exploit detection to time corrected; percentage of exploits detected; percentage of exploits corrected; average time for exploit detection; average time for exploit correction; and average number of assets non-operational.

7. The method of claim 1, wherein scoring for the second subset of users includes determining at least two of: time from initiation of exploit to time detected; time from exploit detection to time corrected; percentage of exploits detected; percentage of exploits corrected; average time for exploit detection; average time for exploit correction; and average number of assets non-operational.

8. The method of claim 1, wherein the tracking by the neutral subsystem includes receiving report data from at least one of the first and second subsets of one or more users via the first or second computer, wherein the report data is related to one or more exploits.

* * * * *